(12) United States Patent
Wall (10) Patent No.: US 11,150,895 B1
(45) Date of Patent: Oct. 19, 2021

(54) AUTOMATICALLY DEPLOYING ARTIFACTS

(71) Applicant: Stripe, Inc., San Francisco, CA (US)

(72) Inventor: Jonathan Wall, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 0 days.

(21) Appl. No.: 16/523,785

(22) Filed: Jul. 26, 2019

(51) Int. Cl.
  *G06F 8/71* (2018.01)
  *G06F 8/65* (2018.01)
  *G06F 8/41* (2018.01)

(52) U.S. Cl.
  CPC ............... *G06F 8/71* (2013.01); *G06F 8/433* (2013.01); *G06F 8/65* (2013.01)

(58) Field of Classification Search
  None
  See application file for complete search history.

(56) References Cited

U.S. PATENT DOCUMENTS

| | | | | |
|---|---|---|---|---|
| 10,534,595 | B1 * | 1/2020 | Lisuk | G06F 8/60 |
| 10,565,093 | B1 * | 2/2020 | Herrin | G06F 8/355 |
| 2009/0070786 | A1 * | 3/2009 | Alves | G06F 9/541 |
| | | | | 719/318 |
| 2014/0282353 | A1 * | 9/2014 | Jubran | G06F 8/00 |
| | | | | 717/101 |
| 2016/0308912 | A1 * | 10/2016 | Mulgaonkar | H04L 63/205 |
| 2016/0378449 | A1 * | 12/2016 | Khazanchi | G06F 9/45558 |
| | | | | 717/120 |
| 2017/0177324 | A1 * | 6/2017 | Frank | G06F 16/173 |
| 2017/0289060 | A1 * | 10/2017 | Aftab | H04L 41/5054 |
| 2017/0364381 | A1 * | 12/2017 | Suber | G06F 9/4401 |
| 2018/0048521 | A1 * | 2/2018 | Nair | G06F 9/44589 |
| 2018/0136970 | A1 * | 5/2018 | Nandagopal | G06F 9/4843 |
| 2018/0173525 | A1 * | 6/2018 | Suparna | G06F 11/3688 |
| 2019/0138288 | A1 * | 5/2019 | Brealey | G06F 8/77 |
| 2019/0171429 | A1 * | 6/2019 | Nguyen | G06F 8/60 |
| 2019/0235846 | A1 * | 8/2019 | Janjua | G06Q 10/067 |
| 2019/0235988 | A1 * | 8/2019 | Janjua | G06F 21/562 |
| 2019/0243644 | A1 * | 8/2019 | Jose | G06Q 10/06313 |
| 2019/0311125 | A1 * | 10/2019 | Mulgaonkar | G06F 9/4406 |
| 2020/0012480 | A1 * | 1/2020 | Rizo | H04L 67/34 |
| 2020/0019471 | A1 * | 1/2020 | Natanzon | G06F 8/65 |
| 2020/0117434 | A1 * | 4/2020 | Biskup | G06F 8/71 |

* cited by examiner

*Primary Examiner* — Philip Wang
(74) *Attorney, Agent, or Firm* — Womble Bond Dickinson (US) LLP (57) ABSTRACT

A method and apparatus for automatically deploying artifacts are disclosed. In one embodiment, the method comprises generating a trusted configuration artifact with a forward immutable continuous integration (CI) implemented as a build pipeline; accessing, by an orchestration system, the trusted configuration artifact from the IAC repository; and automatically deploying the configuration to change a state of the cluster, according to an orchestration type associated with the trusted configuration artifact, including determining the orchestration type.

20 Claims, 8 Drawing Sheets

AUTOMATICALLY DEPLOYING ARTIFACTS

FIELD OF THE INVENTION

Embodiments of the present invention relate to the field of build systems for creating and deploying software and/or other artifacts; more particularly, embodiments of the present invention relate to automatically deploying software and/or other artifacts.

BACKGROUND

Distributed systems are in common use today throughout the world. A distributed system contains components located on different networked computers that run applications. Examples of distributed systems and applications of distributed computing include some network applications such as, for example, information processing systems that are distributed such as payment processing systems and banking systems. The components of the distributed system may include one or more clusters. A cluster is a set of processing components (e.g., servers, virtual machines (VMs), etc.) that operate together to perform a set of data processing operations.

To ensure the stability of large distributed systems, it is desirable to use an infrastructure management system that maintains a cluster in a known deterministic state. In such a system, it is clear in which state the instances are and what versions of those instances are running. In the event of an instance failure, it is simple for a cluster management system to repair the cluster by creating a new instance identical to the lost instance.

To maintain agility for such systems, it is also desirable that the system support the ability to perform rolling upgrades, test for stability and rollback if necessary.

This described pattern of managing infrastructures is known as infrastructure as code and is typically implemented using a source control system that contains the configuration of the system in a repository, a set of tools for digesting the checked in configuration and pushing changes to an orchestration service, and an orchestration service that interacts with the cluster environment to update the cluster in the case of new changes (e.g., rolling upgrades) or repair the cluster in the state of failures.

SUMMARY

A method and apparatus for automatically deploying artifacts are disclosed. In one embodiment, the method comprises generating a trusted configuration artifact with a forward immutable continuous integration (CI) implemented as a build pipeline; accessing, by an orchestration system, the trusted configuration artifact from the IAC repository; and automatically deploying the configuration to change a state of the cluster, according to an orchestration type associated with the trusted configuration artifact, including determining the orchestration type.

BRIEF DESCRIPTION OF THE DRAWINGS

The present invention will be understood more fully from the detailed description given below and from the accompanying drawings of various examples and examples which, however, should not be taken to the limit the invention to the specific examples and examples, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Overview

Methods and apparatuses for automatically deploying an artifact from a secure pipeline are described. In one embodiment, the artifact is deployed automatically to a production system. In one embodiment, the artifact comprises infrastructure as code (IAC). The infrastructure as code may comprise a set of configuration files that describe software (e.g., an application, binary, etc.) to be deployed and describe a particular computer system with a particular configuration on which the software is run. In one embodiment, the software is included in a JAR (Java archive) file that contains a plurality of Java class files with associated metadata and resources into a file. When deployed, in one embodiment, the artifact builds a running version of a cluster (e.g., a virtual machine (VM) cluster, a group of nodes where each node representing a single machine (e.g., a physical machine in a datacenter, a virtual machine hosted on a cloud provider) or unit of computing hardware, etc.).

In one embodiment, the artifact is deployed using a secure pipeline. The pipeline is secure, in part, due to the fact that the input to the pipeline is from a verifiable and provable trustworthy source. In this case, the trustworthy source is an IAC repository that stores the artifact only if it has been generated from a secure source. The IAC repository also includes a description of the state of the computer system to which the artifact is to be deployed. In one embodiment, a secure pipeline produces that artifact that includes a description of the cluster's desired configuration. That is, if a software change has been created (and not yet deployed), the secure pipeline produces a configuration artifact that includes or references code. In one embodiment, the secure pipeline is a forward immutable continuous integration (CI) secure pipeline that generates the artifact and stores it in the repository. Thus, in one embodiment, the deployment framework includes a secure pipeline to generate a trustworthy artifact and a secure pipeline for deploying the artifact as well.

An orchestration system operates as an automated deploy system that notices that there is a new configuration as specified in an artifact and automatically deploys the artifact. In one embodiment, the orchestration system includes a service that monitors the artifact/code outputs of the (build) pipeline and automatically changes the state of the running cluster by automatically deploying the artifact.

In one embodiment, the orchestration system automatically deploys certain software while deploying other software only in response to one or more manual inputs or other events. For example, in one embodiment, less critical software is automatically deployed while more critical software is only deployed after one or more events occur (e.g., one or more additional reviewers check and approve the software change). Thus, in certain cases, multiple individuals have to approve a software change so that the software change is committed into the IAC repository, and only after the pipeline produces a description of the desired state of the cluster and the proper checks have occurred is the software automatically deployed. In one embodiment, the automatic deployment infrastructure includes a user interface (UI) to allow individuals to examine, review and approve the code. In one embodiment, the UI uses use a link to access the software and one or more graphical user interface (GUI) elements (e.g., a button, checkbox, etc.) to indicate approval of the software.

In one embodiment, deployments involve of use of one or more different orchestrators that perform automated configuration, coordination, and management of clusters and software. For example, the deployment could be to Kubernetes and non-Kubernetes orchestrators. The orchestration system determines the orchestrator responsible for deploying an artifact and sends the artifact and/or its associated code to that orchestrator for deployment.

Thus, the infrastructure management system described herein, including it's automatically deployment framework, ensures stability of large distributed systems by maintaining the cluster in a known deterministic state. The infrastructure management system knows the state in which the cluster instances are and the software versions are running on each instance. In the event of an instance failure, a cluster management system is able to repair the cluster by creating a new instance identical to the lost instance.

Furthermore, the infrastructure management system maintains agility for these distributed systems by enabling the performance of rolling upgrades, testing for stability and rolling back upgrades if necessary.

Moreover, in one embodiment, the infrastructure management system ensures the security and correctness of cluster state by having an auditable system in place that requires peer reviews for changes to the cluster state and ensures the cluster is running the correct configuration.

In one embodiment, the automatically deployment framework described herein has one or more of the following features: an infrastructure repository (e.g., a Git repository) that defines the state of a deployed cluster (e.g., VM, computer system, etc.); a provable and auditable chain of trust that proves the configuration as currently deployed (due to the configuration being in a trusted repository); support for mixed mode infrastructure orchestration in which artifacts are deployable using an appropriate orchestrator for the configuration; and support for both resource and container management.

Figure 1:
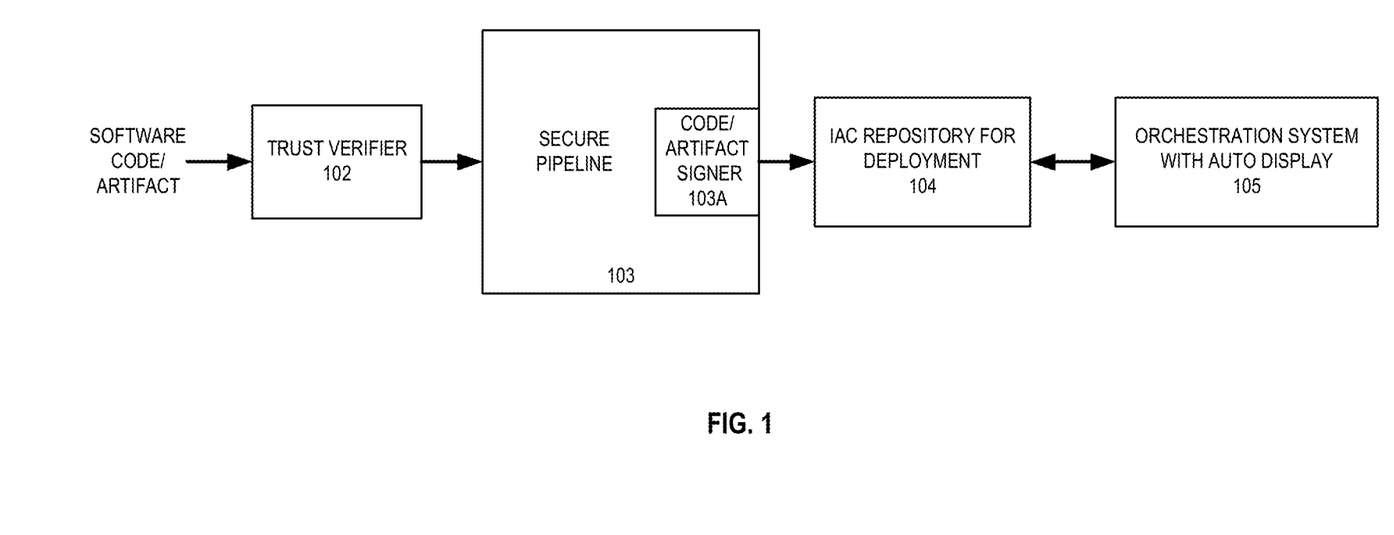
FIG. 1 is a data flow diagram of a framework that includes a forward immutable continuous integration (CI) build framework and an orchestration system with automatic deployment of software.

FIG. 1 is a data flow diagram of a framework that includes a secure pipeline and an orchestration system with automatic deployment of software. In one embodiment, the secure pipeline allows developers to integrate code, including code as infrastructure (IAC), into a shared repository. In one embodiment, the secure pipeline and the orchestration system are implemented with one or more computer systems, servers, hardware, software, and or firmware.

Referring to FIG. 1, a trust verifier 102 receives inputs 101 and verifies their trustworthiness. In one embodiment, inputs 101 include one or more one or more artifacts. The artifacts may include infrastructure as code (IAC) artifacts, software code or other instances of code as set forth herein. Each instance of software code may include one or more, for example, but not limited to, machine images (e.g., an Amazon Machine Image (AMI), etc.), a software source (e.g., an open source software source) produced by Jenkins or some other server-based system, files from a repository (e.g., a Github Enterprise repository). In one embodiment, one or more of inputs 101 are obtained from a repository (not shown).

In one embodiment, trust verifier 102 verifies the trustworthiness of inputs 101. In one embodiment, trust verifier 102 performs a file verification and authentication process to verify the integrity of inputs 101. In one embodiment, the file verification is performed using hash-based verification that compares a hash value (e.g., a cryptographic hash value) that it generates for an input (e.g., a file) with a hash value stored with the input (e.g., the file). If the values match, then trust verifier 102 concludes that the input hasn't been modified during storage by an untrusted third party. In alternative embodiments, trust verifier 102 uses other tools for verification and authentication such as, for example, digital signatures.

After trust verification, the inputs are provided or otherwise made available to secure pipeline 103 in order to create IAC artifacts or other software code for deployment. In other words, in one embodiment, trust verifier 102 stores trusted artifacts or code into a repository for access by the pipeline 103. In one embodiment, a procedure for pipeline 103 is triggered automatically when the IAC artifacts/code is committed to the repository by trust verifier 102. Alternatively, pipeline 103 is triggered in response to a notification that trusted IAC artifacts/code are available for pipeline 103. Pipeline 103 could be triggered to operate in response to a manual input.

In one embodiment, secure pipeline 103 comprises a forward immutable continuous integration (CI) pipeline that is implemented as a build pipeline that has a plurality of stages with forward immutability between consecutive pipeline stages to receive the one or more inputs verified as trustworthy and to build and test software. The software may be part of one or more containers associated with the one or more inputs. In one embodiment, in the build pipeline, each subsequent stage after a first stage of the build pipeline depends on an immutable output of an immediately preceding stage in the build pipeline.

In one embodiment, secure pipeline 103 includes an emission stage 103A for outputting signed, trusted IAC software artifacts/code from the pipeline. In one embodiment, emission stage 103A only outputs an artifact or code that has been signed. In one embodiment, the signing is done using a key. For example, in one embodiment, the signing is performed using a GPG key of the person updating and/or modifying the IAC artifact/code. In another embodiment, the signing is performed using keys of the person modifying the IAC artifact/code and any individual reviewing and/or approving the modification. Note that a policy associated with the IAC artifact/code being developed may dictate the signing required for output from the pipeline. For example, an update to artifact/code that is considered to have more importance or criticality to an organization may require a higher level or greater number of approvers/reviewers that dictate the signing (or amount thereof) necessary for output from emission stage 103A of the pipeline.

After signing and output from emission stage 103A, the signed, trusted IAC artifact/code is stored in IAC repository 104 for deployment using orchestration system 105. In one embodiment, IAC repository 104 only accepts signed IAC artifact/code. In one embodiment, IAC repository 104 has a registry service, such as, for example, a Docker Hub, and the signed IAC artifact/code is pushed there so that they may be deployed using orchestration system 105.

In one embodiment, orchestration system 105 deploys the trusted IAC artifact/code using an automatic deploying service as described in more detail below. In one embodiment, orchestration system 105 includes a deploy pipeline of deploying IAC artifacts/code to one or more clusters (e.g., VMs) through various stages. In one embodiment, orchestration system 105 obtains trusted artifacts from IAC repository 104 (e.g., a Git repository), determines an orchestration type associated with each IAC artifact (e.g., determines an appropriate orchestrator for configuration associated with the artifact) and then deploys the artifact automatically or manually based on a policy. The policy may be based on the critical nature of the IAC artifact and/or its code, one or more predetermined rules, and/or class of software. For example, the policy may specify that more critical code for a privileged environment (e.g., code handling critical data (e.g., private user data)) requires an additional amount of testing and/or multiple steps of auditability prior to deployment. The deployment includes sending the IAC artifact/code to the proper orchestrator (e.g., Kubernetes, Hensen, AWS, Ratched, etc.) for the cluster.

Thus, the pipeline and orchestration system of FIG. 1 serves as a path for IAC artifact/software deployment. Additional details associated with implementations of the above referenced operations are described in more detail below.

Infrastructure as Code Repository

In one embodiment, IAC repository 104 includes the deterministic state of the deployed system as described above. In one embodiment, this includes the active software and configuration of the system as well as the cluster environment including information such as, for example, but not limited to, network configuration, security groups, and instance roles.

In one embodiment, IAC repository 104 has a cluster identifier (e.g., software_name, software_location) and a region identifier (e.g., US-East-2, US-West-1). Below is an example of what such a directory structure might resemble.

/<cluster>/<region>/<mode>/terraform/<create resource like a named_asg>

/<cluster>/<region>/<mode>/resource/<named_ami or named_asg>

/<cluster>/<region>/<mode>/config/kubernetes/<server>
/<cluster>/<region>/<mode>/config/henson/<server>
/<cluster>/<region>/<mode>/config/ratched/<server>

In an alternative embodiment, the hierarchy is

/<cluster>/<service>/<mode>/<region>.

In one embodiment, the mode specifies the production or test environment, which defines different releases and the different policies associated with them.

In one embodiment, the cluster creates and names resources that would be referenced and configured in a resources directory (e.g., set AMI-123 to be instance image for auto scaling group (ASG) such as ASG-FOO), while the configuration portion of the repository describes the software versions and configuration that should be running on the named resource (e.g., the software bar-srv-v456 should be running on ASG-FOO).

In one embodiment, IAC repository 104 is managed within Git and commits require peer review and approval. In one embodiment, a necessary OWNERS file is added to constrain who was allowed to provide a review for a particular portion of the repository.

Since the state of infrastructure exists within IAC repository 104, there is a clear audit trail of both who committed and approved code.

An Example of an Orchestration System

In one embodiment, the orchestration system compiles the content of an IAC artifact in the IAC repository and deploys the associated configuration to the desired cluster. In one embodiment, the cluster comprises one or more virtual machines (e.g., a network of virtual machines). In one embodiment, the content represents reviewed and trusted IAC artifact that have been committed. In one embodiment, the repository is a Git infrastructure repository environment.

Figure 2:
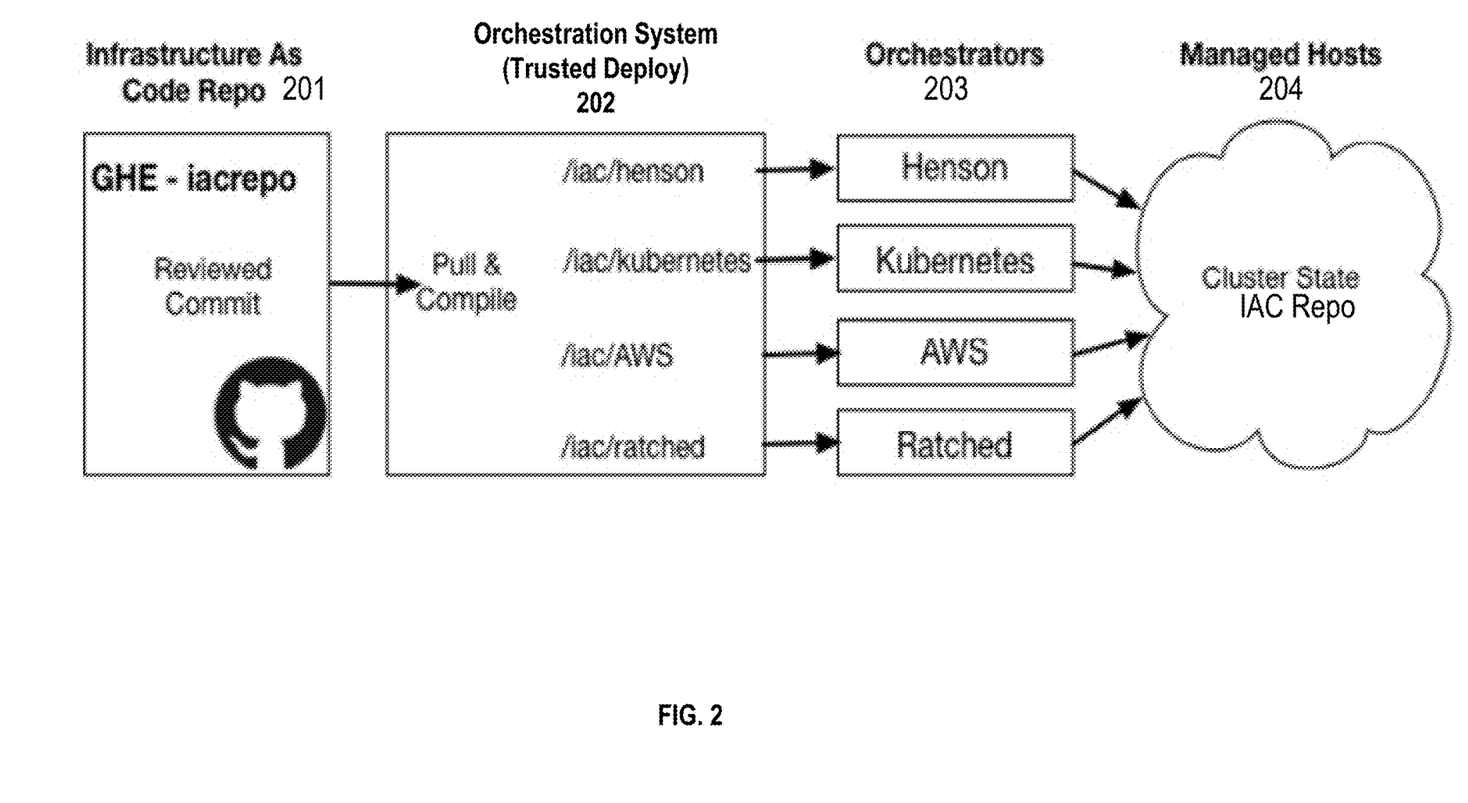
FIG. 2 illustrates an orchestration framework for deploying a configuration to a cluster.

FIG. 2 illustrates an orchestration framework for deploying a configuration to a cluster. Referring to FIG. 2, orchestration system 202 obtains committed IAC artifacts from IAC repository 201. The committed IAC artifact includes software code. For example, when looking to deploy a new version of software, an engineer generates a software update that is committed and stored in repository 201. In one embodiment, the commit triggers orchestration system 202 to automatically cause the framework to deploy the newly committed software. In one embodiment, orchestration system 202 pulls the committed artifacts from repository 202 using one or more pull requests (PRs), compiles their code, and automatically sends the compiled code to one of a set of one or more orchestrators 203 that deploy the code (containers) to a set of one or more managed hosts 204.

In one embodiment, orchestrators 203 include one or more of Henson, Kubernetes, AWS, Ratched, etc. The one or more managed hosts include at least one cluster (e.g., virtual machine) that has a cluster state. In one embodiment, orchestration system 202 is able to work with existing management frameworks such as, for example, Henson, Kubernetes, AWS, Ratched, etc., to ensure the cluster is in the correct state because orchestration system 202 understands the desired correct state of the cluster. In one embodiment, orchestration system 202 determines the type of orchestrator to deploy the code of the IAC artifact and sends the code to the orchestrator of the determined type (e.g., performs protected write operations to one orchestrator). In one embodiment, this determination is performed via a configuration option and identifying the primitive that is being deployed.

Thus, the orchestration system described above allows for a mixed orchestration environment that uses multiple types of orchestrators. The orchestration system wraps and automates interaction with a variety of orchestration frameworks. In this way, multiple software teams providing updates for different portions of software code associated with different orchestrators leverage the orchestration service described herein regardless of their current orchestration framework. In this way, the teams could also then independently choose to move between frameworks. Furthermore, the interface to multiple orchestrators means that, while codified infrastructure will exist in a single repository, changes to specific parts of the repository can be applied to multiple output agents, depending on what configuration or defined resources have changed.

In one embodiment, the orchestration system manages privileged environments associated with accessing trusted IAC artifacts from IAC repository 201 and sending secure write operations to the orchestrator. Because these domains are secure, the orchestration framework is both secure and auditable.

Trigger from Manual Commits

Figure 3:
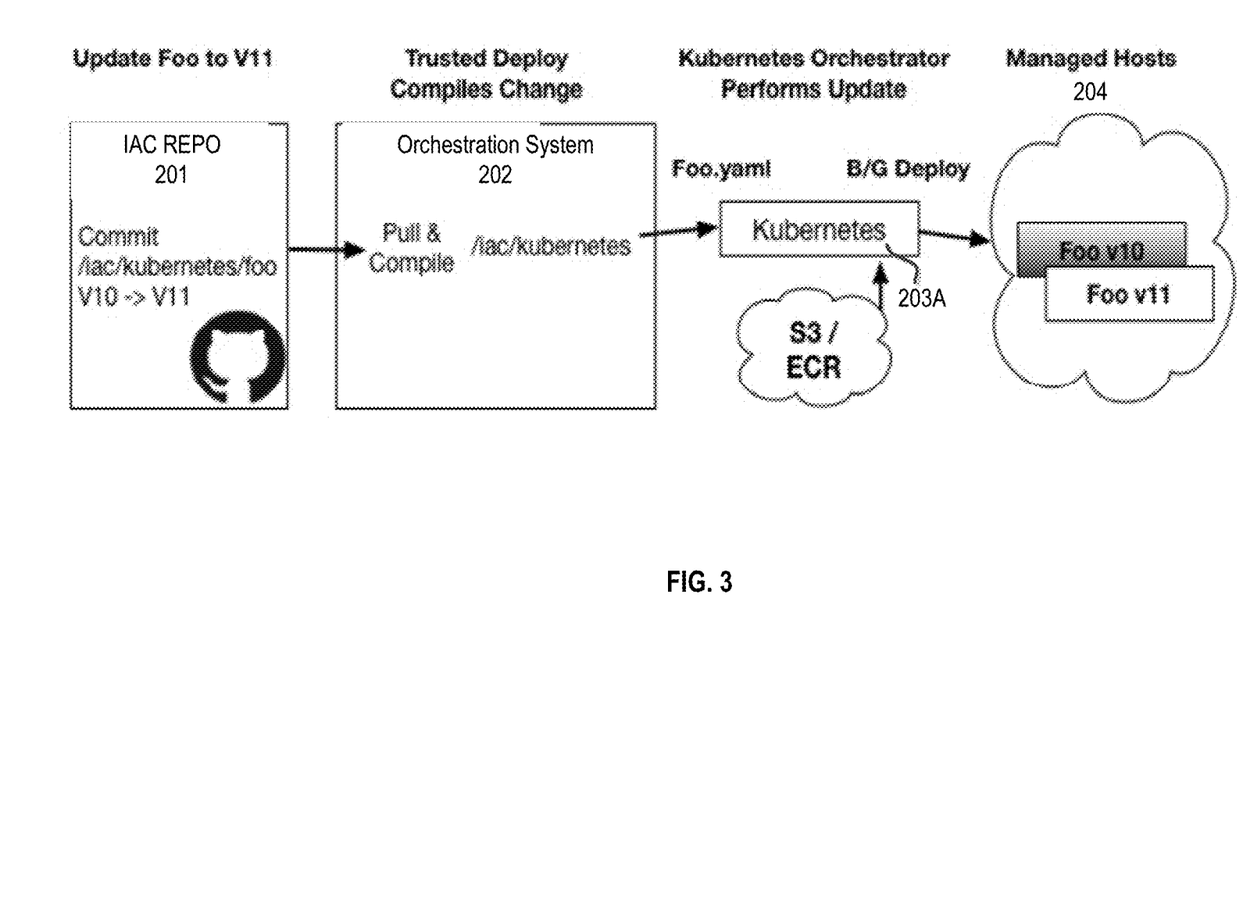
FIG. 3 illustrates an example deployment in which changes solely to files defining a desired state of a Kubernetes pod are pushed to a Kubernetes orchestrator.

In one embodiment, environments or services that are manually controlled have deployments triggered by approved pull requests (PRs) that are landed to the master branch (pointer to a software commit). In one embodiment, the orchestration system pulls the master branch, inspects the changes that have been made, and knows which orchestrators to signal to complete deployment. In one embodiment, the master branch is pulled in response to prompting by the repository (e.g., prompted by a GHE web hook or CIBot. In one embodiment, changes solely to files defining the desired state of a Kubernetes pod will be pushed to the Kubernetes master. FIG. 3 illustrates an example of such a deployment. Referring to FIG. 3, a file defining a desired state of a Kubernetes pod that has been committed to repository 201. In this example, the file FOO has been updated from version 10 (v10) to version 11 (v11). Orchestration system 202 detects the commitment of the file FOO has occurred and obtains the file FOO from repository 201. In one embodiment, orchestration system 202 obtains the file by pulling the file from repository 201 using a pull request. Orchestration system 202 compiles the code of file FOO and pushes it to the Kubernetes orchestrator (master) 203A, which performs the update to managed hosts 204. The update causes version 10 (v10) of the file to be replaced version 11 (v11) of the file.

Similarly, for example, in one embodiment, a change to an ASG configuration results in the orchestration system (or a downstream tool or service) signaling the AWS API to apply the changes to the AWS resources.

Conversely, changes to any referenced resources may result in actions performed on multiple orchestration agents. For instance, if the AMI ID (defined as on a machine image resource) referenced in both ASG and Ratched configuration changes, the orchestration system knows that the change affects multiple systems and triggers the correct actions against Ratched and the AWS API to apply these updates.

Trigger From New Release in S3

In one embodiment, for environments and services that are deployed very frequently (and unprivileged), every new release that was built from changes that has been approved and landed to the master branch is rolled out. In this case, any applicable configuration files in the IAC repository that reference the software release would be set as "LATEST" (or some other appropriately names to indicate it's the latest version), implying that the orchestration system should deploy every new release. In one embodiment, releases are configured to roll to Canary so that the rollout occurs to a subset of users and pause to wait for automated health checks to pass, or to block pending further engineer approval to complete the roll out.

Figure 4:
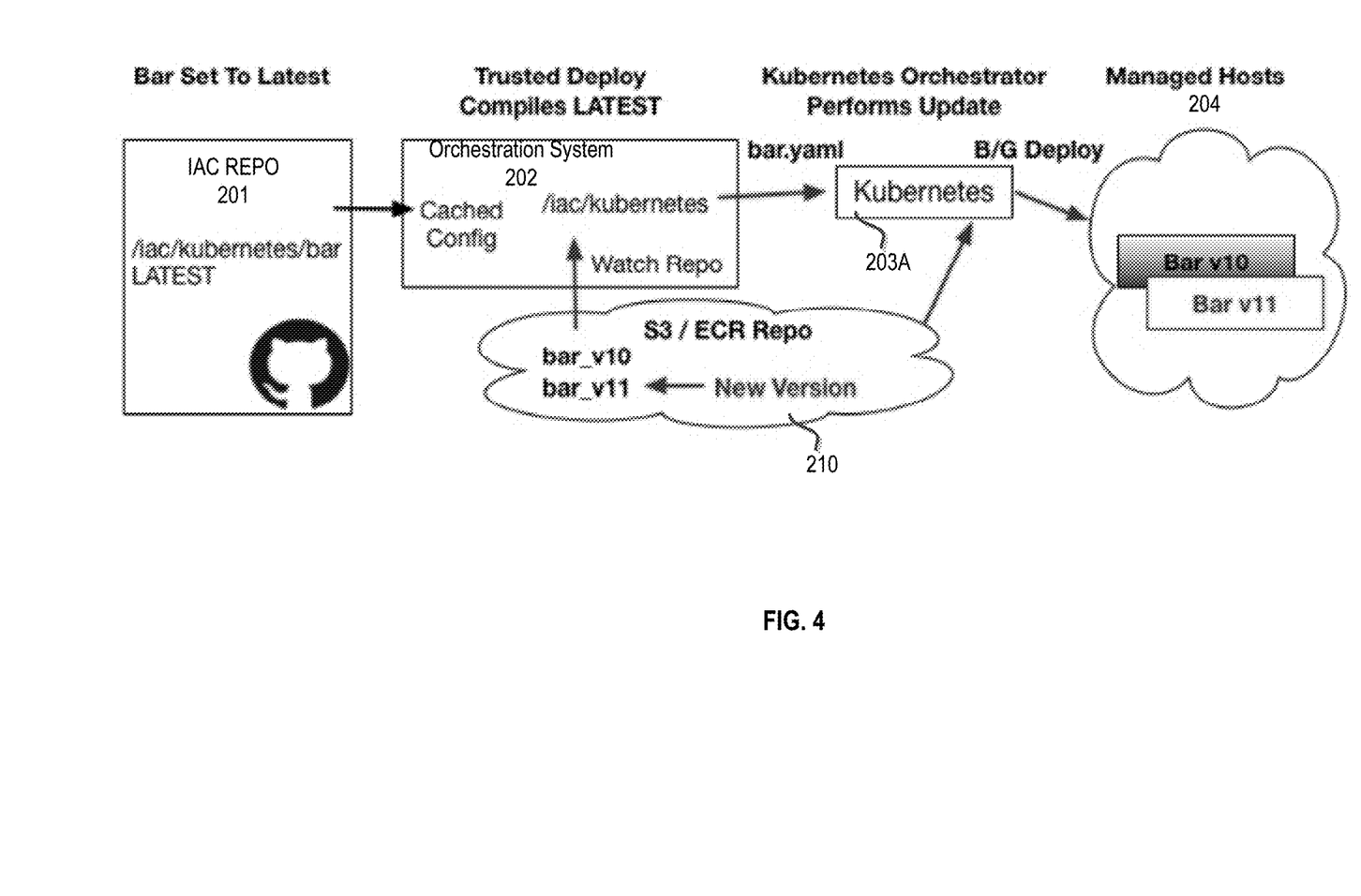
FIG. 4 illustrates an example of deploying a software release.

FIG. 4 illustrates an example of deploying a software release. Referring to FIG. 4, the software release called Bar is set with the status of "LATEST" in repository 201. However, the new version of Bar, bar v11, is in S3.ECR repository 210. Orchestration system 202 obtains Bar from repository 210 and compiles it. Orchestration system 202 compiles pushes the compiled code to the Kubernetes orchestrator (master) 203A, which is the orchestrator associated with the code of bar v11. In response, Kubernetes 203A performs the update to managed hosts 204. The update causes Bar version 10 (v10) of the file to be replaced version 11 (v11) of the file.

For each newly built release, orchestration system 202 notices and finds any configurations files in IAC repository 201 that reference the service (e.g., Henson configurations files referencing pay-server-LATEST) and signal the downstream orchestrators that will finish the deployment.

Deploy User Experience (UX)

In one embodiment, for both manually and automatically triggered deployments, people (e.g., engineers) are able to monitor the progress of their deployments, vet the release as it is deployed, and immediately stop/roll back the release if they notice errors or bugs.

In one embodiment, the orchestration system is extended to have a UX that shows the release history (with the results), any in-flight releases, and controls for pausing or rolling back a release. For systems or environments that have high velocity of new releases, this page also shows a queue of releases that are pending deployment. Lastly, if an environment has been configured to require manual approval (e.g., engineer approval) prior to pushing a new release beyond the canary environment, those controls will live here.

Additional extensions can be built for the orchestration service. Some obvious examples include email notifications and Slack integrations to notify the relevant parties for new deployment success/failure/pending action.

Trust Mechanics Associated with the Orchestration System

Figure 5:
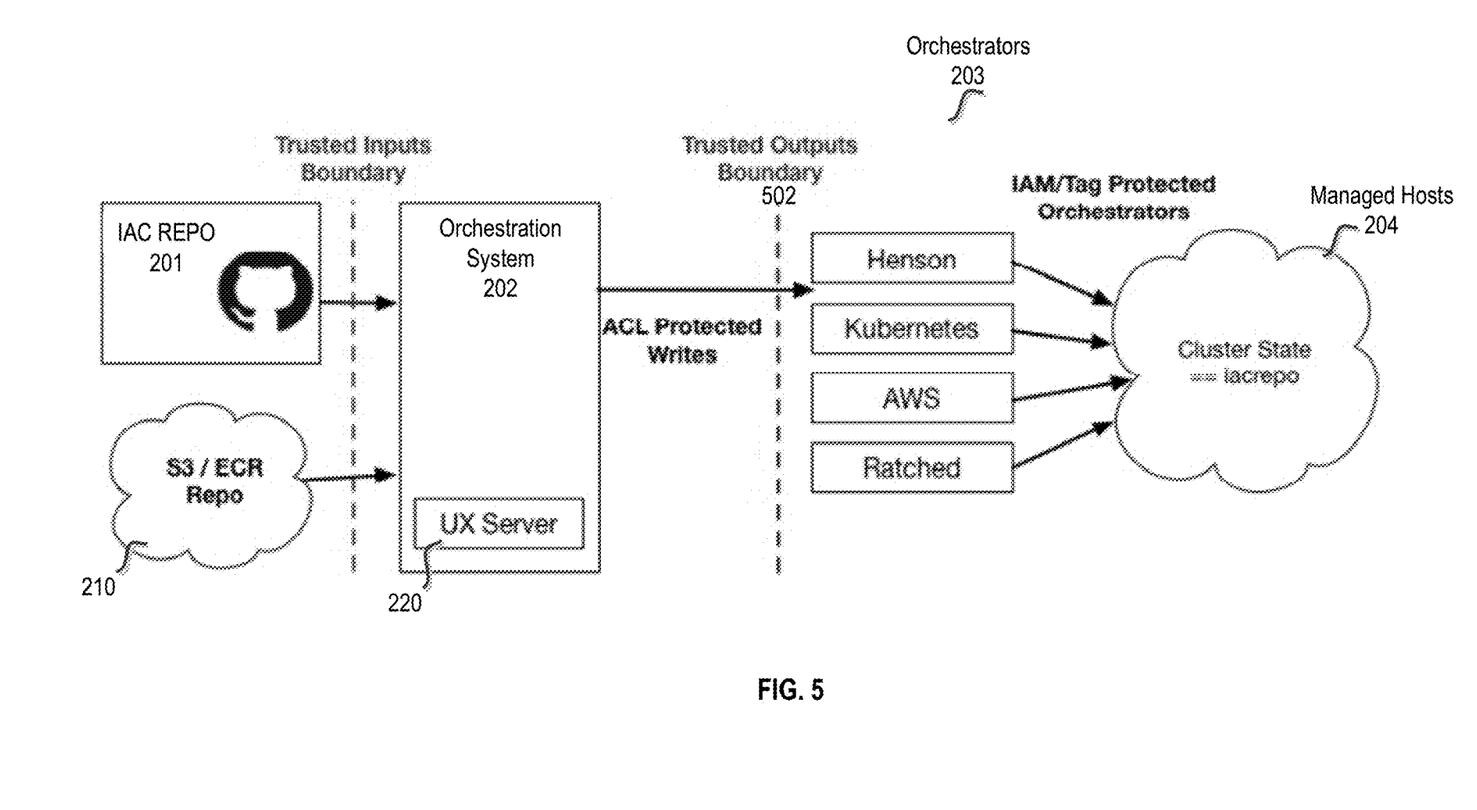
FIG. 5 illustrates one embodiment of an orchestration framework with trusted boundaries.

In one embodiment, the trust in this system is rooted in signed commits to repositories (e.g., an IAC repository 201 (in GHE in one embodiment) plus signed artifacts in the S3/ECR repository 210). In one embodiment, to maintain the chain of trust, the orchestration service is given special access controls such that only it can write changes to the downstream orchestrators 203 (e.g., Kubernetes, Henson, AWS, Ratched, etc.). In one embodiment, access to the orchestration service is restricted to a minimal set of people who can log into the box, and all access should be audited.

FIG. 5 illustrates one embodiment of the orchestration framework with trusted boundaries. Referring to FIG. 5, orchestration system 202 receives trusted inputs from repository 2012 and S3/ECR repository 210. This forms the first trusted boundary, trusted inputs boundary 501, of the orchestration framework. In one embodiment, the inputs are trusted because they are signed when committed to their respective repository. In one embodiment, all changes to the cluster state are audited. To accomplish this, all commits to IAC repository 201 are signed by the person proposing the change and repository 201 requires a signature (e.g., GPG signature) plus a separate reviewer for the commits to occur.

In one embodiment, orchestration system 202 pushes compiled files to orchestrators 203 via protected write operations. In one embodiment, the protected write operations are access control list (ACL) protected write operations. Other well-known protected write operations may be used. Because of the use of protected write operations, this forms the second trusted boundary, trusted outputs boundary 502, of the orchestration framework. In one embodiment, orchestration system 202 operates between the trust boundaries.

In one embodiment, UX server 220 is included in orchestration system 202. In this way, UX server 220 is within the trusted boundaries of orchestration system 202, namely trusted inputs boundary 501 and trusted outputs boundary 502.

In one embodiment, all actions taken by the orchestration system are written to an append-only log stored in S3 repository. Since the orchestration system is the only framework with permission to make changes to the cluster state, this guarantees that all changes will be audited.

Figure 6:
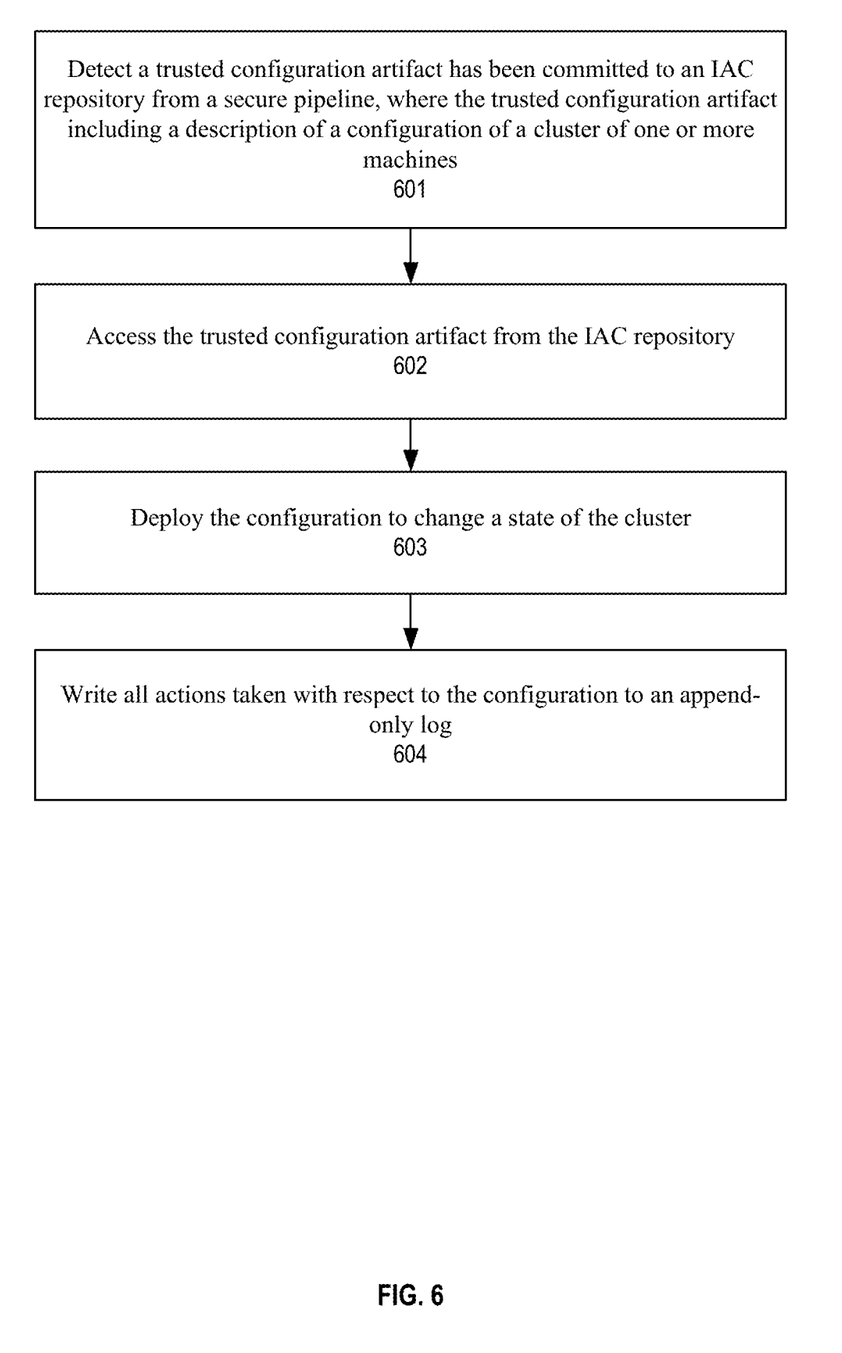
FIG. 6 is a flow diagram of one embodiment of a process for orchestrating Infrastructure as Code (IAC).

FIG. 6 is a flow diagram of one embodiment of a process for orchestrating Infrastructure as Code (IAC). The process is performed by processing logic that may comprise hardware (circuitry, dedicated logic, etc.), software (such as is run on a general-purpose computer system, a server, or a dedicated machine), firmware, or a combination of the three.

Referring to FIG. 6, the process begins by processing logic detecting a trusted configuration artifact has been committed to an IAC repository from a secure pipeline, where the trusted configuration artifact includes a description of a configuration of a cluster (e.g., one or more machines) (processing block 601). In one embodiment, the detection of the trusted configuration artifact is performed by processing logic of an orchestration system. In one embodiment, the trusted configuration artifact has a provable, auditable chain of trust. In one embodiment, the trusted configuration artifact is produced by a forward immutable continuous integration (CI) implemented as a build pipeline having a plurality of stages with forward immutability between consecutive pipeline stages. In the build pipeline, each subsequent stage after the first stage of the build pipeline depends on an immutable output of a previous stage in the build pipeline. In one embodiment, the build pipeline includes an emission stage for outputting signed, trusted configuration artifact from the build pipeline. In one embodiment, the trusted configuration artifact has been signed by a person proposing the change to the configuration and a separate peer review and approval to become committed into the IAC repository.

After detecting the trusted configuration artifact, processing logic accesses the trusted configuration artifact from the IAC repository (processing block 602). In one embodiment, the processing logic is part of the orchestration system. In one embodiment, the trusted configuration artifact is pushed to the orchestration system. In another embodiment, the orchestration system performs a read request to the repository to obtain the trusted configuration artifact.

Once the trusted configuration artifact has been accessed, processing logic automatically deploys the configuration to change a state of the cluster according to an orchestration type associated with the trusted configuration artifact, including determining the orchestration type (processing block 603). In one embodiment, automatically deploying the configuration to change the state of the cluster comprises compiling code and signaling to one or more orchestrators to perform the update to the configuration. In one embodiment, signaling to the one or more orchestrators comprises performing protected writes to the one or more orchestrators to interact with the cluster environment to update the configuration. In one embodiment, these operations are performed by the orchestration system.

Processing logic also writes all actions taken with respect to the configuration to an append-only log (processing block 604). By having an append-only log of the actions taken to change a configuration, the process of deploying the artifact may be reversed if necessary.

An Example of a Secure Forward Immutable Pipeline

Figure 7:
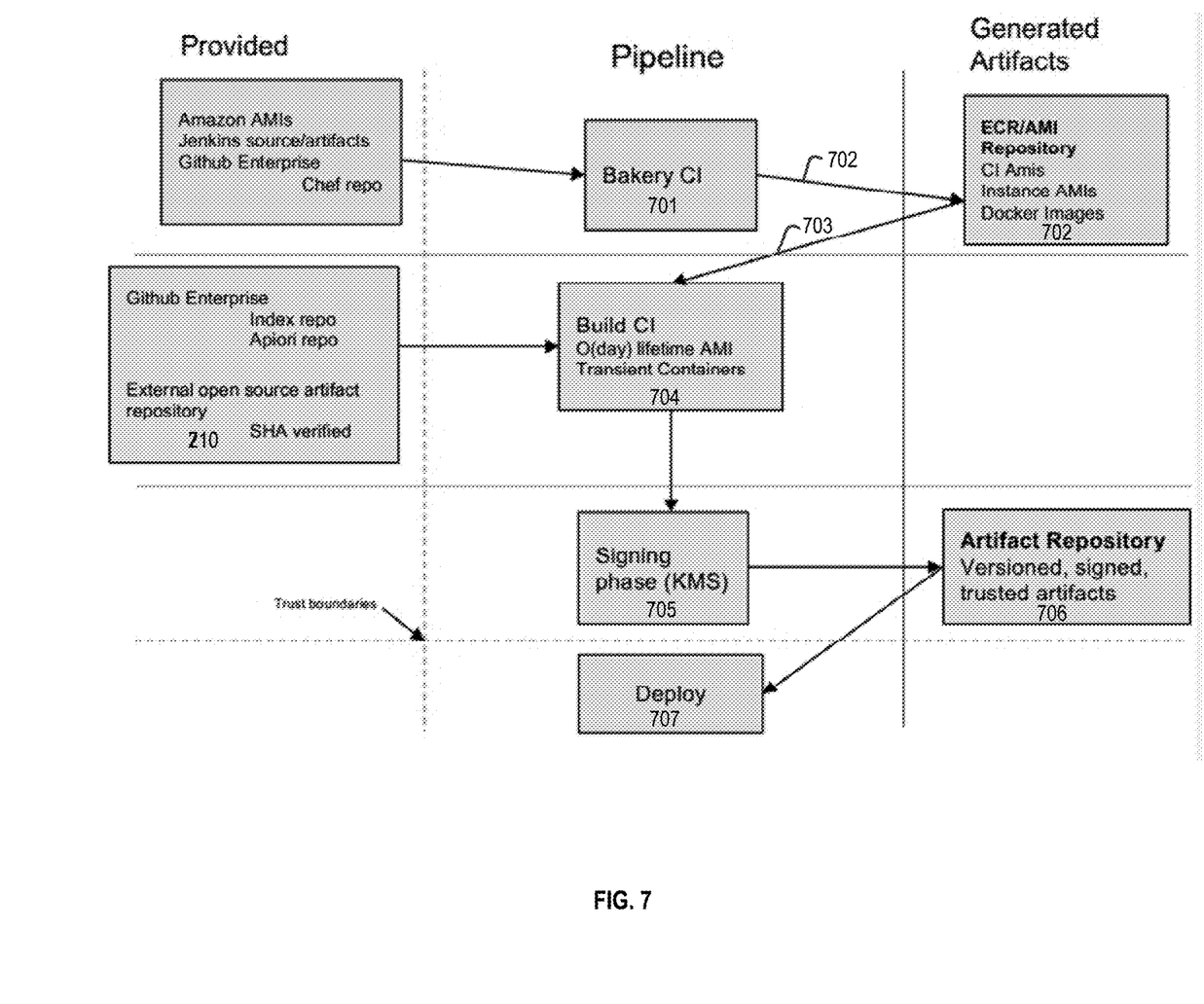
FIG. 7 illustrates one embodiment of a forward immutable CI pipeline.

FIG. 7 illustrates one embodiment of a forward immutable CI pipeline that acts as a secure pipeline to produce IAC artifacts/code. In one embodiment, the forward immutable CI pipeline is implemented as a build pipeline consisting of a set of stages. In one embodiment, the first stage of the build pipeline acts as the root of trust for the system. In one embodiment, to ensure security, the root of the pipeline is only accessible to a select group of individual, and includes tight audit features. Each subsequent stage of the build pipeline inherits the security of and depends on the immutable output of the previous stage.

A critical notion of the pipeline is forward immutability such that for each stage of the pipeline, all assets generated in a prior stage are immutable to actors in that stage of the pipeline. To give a specific example, the AMIs/containers generated in phase 701 would be immutable to the run time in phase 703.

Due to the notion of forward immutability, in one embodiment, each stage of the pipeline is only capable of leveraging assets from previous phases of the pipeline, gathering new validated input and building/generating a new output for the following pipeline stage for which the assets would be immutable. Even so, the characteristic of forward immutability allows a chain of trust to be built such that each stage is able to derive its notion of security from the previous stage.

Referring to FIG. 7, the five stage build pipeline that flows through a bakery CI phase 701, a repository phase 702, a build deploy phase 703, a build CI phase 704, and an emission stage 705.

In one embodiment, bakery CI phase 701 uses continuous integration (CI) to build and test the container images before shipping (or deploying) them to their registry for deployment. The bakery CI stage is the first stage and root of trust in the build pipeline.

In one embodiment, bakery CI phase 701 builds the containers in response to trusted inputs that are provided. In one embodiment, the trusted inputs include one or more of Amazon AMIs, Jenkins source/artifacts, and instances of software. In one embodiment, the Bakery CI stage's trusted input is from a GHE repository that's mostly a Chef configuration (or other configuration language) that provisions AMIs. In one embodiment, the Chef configuration contained in this repository ensures the immutability of the resulting CI and Instance AMIs. For example, in one embodiment, any/all unbounded binaries are removed from the output CI and instance AMIs. Similarly, in one embodiment, build-specific Docker images are tuned to only include compilation tools necessary for the specific build they were designed to execute.

In one embodiment, bakery CI phase 701 is responsible for building a Jenkins master AMI, a Jenkins worker AMI, and any Docker images necessary to run specific builds. In one embodiment, bakery CI phase 701 performs a process of acquiring, building and releasing machine images or other containers to allow repeatable deployments of working code. Thus, bakery CI phase 701 builds containers that include software. In one embodiment, containers are generated by bakery CI phase 701 that include machine images such as, for example, CI Amazon Machine Images (AMIs) and instance AMIs (e.g., AMIs from which cluster servers are launched), and build images (e.g., Docker images used to execute specific builds). Note that in one embodiment, Jenkins master/worker CI nodes are launched from the CI AMIs.

In one embodiment, bakery CI phase 701 is divided into smaller parts such that a Jenkins Bakery CI phase only builds Jenkins AMIs and a subsequent phase builds only Instance AMIs and Docker Images. In one embodiment, future steps of the CI pipeline require Docker to properly isolate containers from one another, and therefore the Chef configuration ensures that Docker is installed and configured properly on these machines.

In one embodiment, bakery CI phase 701 runs on a CI cluster (e.g., VM, server, computer system, etc.). Since bakery CI phase 701 itself runs on a CI cluster, the initial build and bootstrap of the cluster is manual. Beyond the initial build, bakery CI phase 701 leverages prior instances to build the next version.

In one embodiment, the output of a bakery is a baked image that is used to spin off instances of machine images, such as, for example, but not limited to, virtual machines (VMs) or containers, in any compatible environment. The environment may be in the form of hypervisors or container engines that support the deployment of these baked images.

In one embodiment, the artifacts (e.g., containers) generated by the bakery CI phase 701 are stored in and accessed from a repository (e.g., a GitHub Enterprise Chef repository) as part of phase 702. In one embodiment, the repository is a Docker Image/AMI Repository that holds the registry (e.g., an Elastic Container Registry (ECR)) used to store Docker images and AMIs. In one embodiment, the AMIs are stored in an S3 bucket. In one embodiment, both are tagged with the Git SHA (or other hash) used to build them and a build ID.

In one embodiment, while the later stages of the build pipeline enjoy forward immutability from one stage of the pipeline to another, the Bakery CI stage has a similar benefit in the form of temporal immutability. This is due to the fact that in one embodiment, the final output artifact repository is append-only from the Build CI stage such that only new trusted and signed artifacts are produced. The append-only nature of this repository gives the Bakery CI a notion of forward immutability that is temporal i.e. previous builds are immutable to Bakery CI phase. In one embodiment, append-only behavior is implemented by using AWS permissions and/or application logic. Additional secure methods (e.g., artifact signing) may be used. In one embodiment, the repository is read-only from the deploy environment (e.g., read-only from the downstream Build CI), such that the trusted artifacts could not be modified.

After artifacts are generated by bakery CI phase 701 and stored in a repository as part of phase 702, a bakery deploy phase 703 is used to deploy the software to the build CI phase 704. In one embodiment, bakery deploy phase 703 deploys specified CI AMIs to the build CI phase 704. That is, the Bakery CI stage of the pipeline produces trusted CI AMIs that are stored in a repository and deployed to orchestrate the Build CI stage of the pipeline. In one embodiment, the CI AMIs are used to launch Jenkins clusters to orchestrate distributed builds. In such a case, a CI server downloads and builds code from different links, checks for any errors that occur when running them against inbuilt tests, and then reports those errors in a log in an automated fashion.

In one embodiment, the Bakery deploy stage uses a "deploy" repository to describe the desired configuration of the AMIs in the Build CI and deploys them to ensure the Build CI is legally configured. This deploy operation gives a build team an additional gate to audit and validate changes and allow for the Bakery to be rolled forward/back as necessary.

In response to the CI AMIs deployed in bakery deploy phase 703 from repository 701 (e.g., a GitHub Enterprise repository, an external open source artifact repository, etc.), build CI phase 704 builds images containing code (e.g., application code) used to execute specific build targets. These build images are output as artifacts.

In one embodiment, the Build CI is triggered by the repository (e.g., any mapped GHE repository), with the triggered build depending upon the previous Bakery CI phase and an immutable Docker image to run the specific build instance. The required images are fetched from the repository (and optionally cached to save bandwidth) and since no additional provisioning is required, a container is launched and the build can start immediately. In one embodiment, a Dockerfile is committed to the source repository that explicitly selects the Docker image build version (produced from the bakery stage) to use.

In one embodiment, the CI build process is as follows. First, an engineer commits a change to the bakery repository. Then that engineer kicks off a build that produces a new Docker image and then creates a series of pull requests (PRs), in each repository, to cause the Dockerfile to use the new Docker image. The PRs get merged in, and the new Docker image is officially in use. Note that this flow blocks the automatic forward trigger of subsequent builds.

In another embodiment, the "consumers" of the Docker image use the "latest" version (i.e., the images are still versioned), but new builds are forward triggered using the "latest" version.

After build CI phase 704, in one embodiment, the output of Build CI phase 704 is a completed/built artifact passed into the artifact emission phase 705, or stage. Emit phase 705 signs the artifacts and puts them into an artifact repository 706 which stores signed artifacts so that they may be deployed during a deploy phase 707. In one embodiment, artifact repository 706 is an append-only repository. In one embodiment, the append-only repository is an append-only S3 bucket in which the bucket has versioning enabled or that a particular S3 key has only one version which once written cannot be modified.

In one embodiment, the signing is performed using GPG keys. In one embodiment, the Shiner KMS-backed signer (e.g., Shiner) signing utility is used for signing the output of the build CI phase 704. The build CI worker is given a signed attestation of the source SHA (and repo metadata) and the CI worker presents Shiner with the attestation and resulting digest and receives a complete attestation (S(source,artifact,metadata)). In one embodiment, this is stored alongside the artifact in an S3 bucket.

Once artifacts are stored in repository 706, they may be deployed using software deploy stage 707. The deployment may involve an orchestration system as described above. In this way, artifacts/software developed and tested as part of a build process is deployed into use.

Because inputs into the forward immutable CI pipeline are trusted inputs (e.g., software code, artifacts, etc.), there is a trust boundary between the inputs and the forward immutable CI pipeline. Furthermore, since the output of the forward immutable CI pipeline is a signed, trusted artifact, the output of the forward immutable CI pipeline also forms a trust boundary. These two trust boundaries and the forward immutability of the CI pipeline itself allow the framework to be provably or demonstrably secure.

Figure 8:
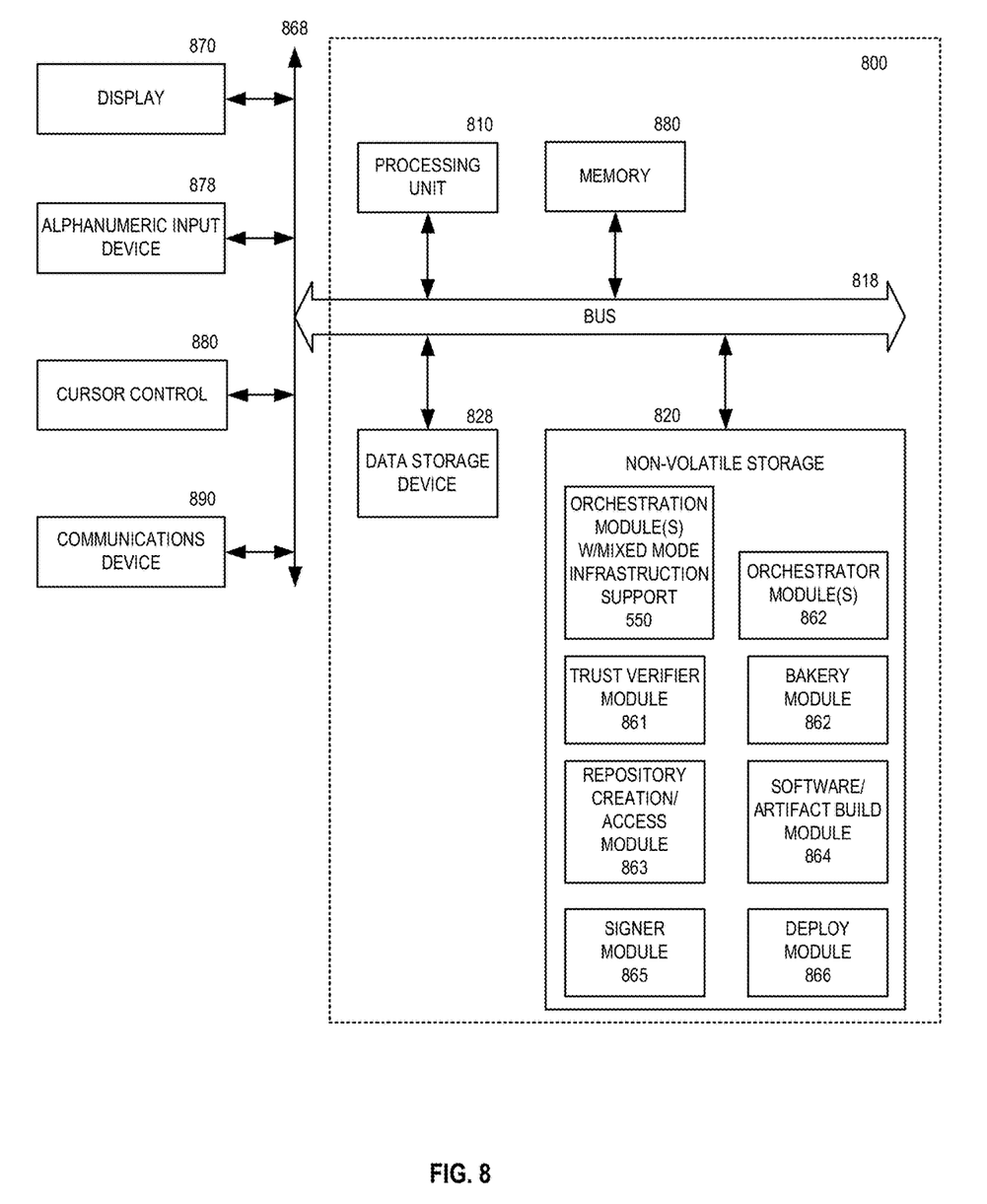
FIG. 8 is one embodiment of a computer system.

FIG. 8 is one embodiment of a computer system that may be used to support the systems and operations discussed herein. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

In one embodiment, static storage device 820 stores orchestration module with mixed mode infrastructure support 550 that access IAC artifacts from a repository (e.g., repository 201), determines an orchestrator associated with the configuration and code of the artifacts, and sends the code to the determined orchestrator for deployment into a managed host. In one embodiment, these operations are performed as described above.

In one embodiment, static storage device 820 also stores one or more orchestrator modules 551 to perform the operations of the orchestrators described above. In one embodiment, there are separate orchestrator modules for one or more of Henson, Kubernetes, AWS, Ratched orchestrators.

In one embodiment, static storage device 820 also stores a trust verifier module 861 which when executed causes the system to perform trust verification as described above, stores a bakery module 862 which when executed causes the system to execute a bakery (e.g., CI bakery) as described above, stores a repository creation/access module 863 which when executed causes the system to provide repository services as described above, stores a software/artifact build module 864 which when executed causes the system to perform a build (e.g., a CI build) as described above, stores a signer module 865 which when executed causes the system to sign software as described above, and stores a deploy module 866 which when executed causes the system to deploy software as described above. Note that one or more of these modules may be stored and executed on different machines (e.g., computer systems, severs, etc.).

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

Some portions of the detailed description described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "providing", "encrypting", "decrypting", "selecting", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Whereas many alterations and modifications of the present invention will no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims which in themselves recite only those features regarded as essential to the invention.

What is claimed is:

1. A method for orchestrating Infrastructure as Code (IAC), the method comprising:
generating a trusted configuration artifact with a forward immutable continuous integration (CI) implemented as a build pipeline having a plurality of stages with forward immutability between consecutive pipeline stages, with all assets generated in a prior stage of the plurality of stages being immutable to actors in a subsequent stage of the pipeline, wherein each subsequent stage after a first stage of the build pipeline depends on an immutable output of a previous stage in the build pipeline;
detecting, by an orchestration system, the trusted configuration artifact has been committed to an infrastructure as code (IAC) repository from a secure pipeline, the trusted configuration artifact including a description of a configuration of a cluster of one or more machines;
accessing, by the orchestration system, the trusted configuration artifact from the IAC repository; and
automatically deploying the configuration using an orchestrator of the orchestration system to change a state of the cluster, according to an orchestration type associated with the trusted configuration artifact, including determining the orchestration type associated with the orchestrator based on a configuration option associated with the trusted configuration artifact and determining the orchestrator responsible for deploying the determined orchestration type for the configuration associated with the trusted configuration artifact.

2. The method defined in claim 1 wherein automatically deploying the configuration to change the state of the cluster comprises compiling code, by the orchestration system, and signaling to one or more orchestrators to perform the update to the configuration.

3. The method defined in claim 1 wherein signaling to the one or more orchestrators comprises performing protected writes to the one or more orchestrators to interact with the cluster to update the configuration.

4. The method defined in claim 1 wherein the trusted configuration artifact is pushed to the orchestration system.

5. The method defined in claim 1 wherein the trusted configuration artifact has a provable, auditable chain of trust.

6. The method defined in claim 5 wherein the build pipeline includes an emission stage for outputting signed, trusted configuration artifact from the build pipeline.

7. The method defined in claim 5 wherein the trusted configuration artifact has been signed by a person proposing the change to the configuration and a separate peer review and approval to become committed into the IAC repository.

8. The method defined in claim 1 further comprising writing all actions taken with respect to the configuration to an append only log.

9. A non-transitory computer readable storage media having instructions stored thereupon which, when executed by a system having at least a processor and a memory therein,
cause the system to perform a method for orchestrating Infrastructure as Code (IAC), the method comprising:
generating a trusted configuration artifact with a forward immutable continuous integration (CI) implemented as a build pipeline having a plurality of stages with forward immutability between consecutive pipeline stages, with all assets generated in a prior stage of the plurality of stages being immutable to actors in the one a subsequent stage of the pipeline, wherein each subsequent stage after a first stage of the build pipeline depends on an immutable output of a previous stage in the build pipeline;
detecting the trusted configuration artifact has been committed to an infrastructure as code (IAC) repository from a secure pipeline, the trusted configuration artifact including a description of a configuration of a cluster of one or more machines;
accessing, by an orchestration system, the trusted configuration artifact from the IAC repository; and
automatically deploying the configuration using an orchestrator of the orchestration system to change a state of the cluster, according to an orchestration type associated with the trusted configuration artifact, including determining the orchestration type associated with the orchestrator based on a configuration option associated with the trusted configuration artifact and determining the orchestrator responsible for deploying the determined orchestration type for the configuration associated with the trusted configuration artifact.

10. The computer readable storage media defined in claim 9 wherein automatically deploying the configuration to change the state of the cluster comprises compiling code, by the orchestration system, and signaling to one or more orchestrators to perform the update to the configuration.

11. The computer readable storage media defined in claim 9 wherein signaling to the one or more orchestrators comprises performing protected writes to the one or more orchestrators to interact with the cluster to update the configuration.

12. The computer readable storage media defined in claim 9 wherein the trusted configuration artifact is pushed to the orchestration system.

13. The computer readable storage media defined in claim 9 wherein the trusted configuration artifact has a provable, auditable chain of trust.

14. The computer readable storage media defined in claim 13 wherein the build pipeline includes an emission stage for outputting signed, trusted configuration artifact from the build pipeline.

15. The computer readable storage media defined in claim 13 wherein the trusted configuration artifact has been signed by a person proposing the change to the configuration and a separate peer review and approval to become committed into the IAC repository.

16. The computer readable storage media defined in claim 9 wherein the method further comprises writing all actions taken with respect to the configuration to an append only log.

17. A system for orchestrating Infrastructure as Code (IAC), the system comprising one or more hardware processors;

a memory comprising instructions which, when executed by the one or more hardware processors, cause the system to:
  generate a trusted configuration artifact with a forward immutable continuous integration (CI) implemented as a build pipeline having a plurality of stages with forward immutability between consecutive pipeline stages, with all assets generated in a prior stage of the plurality of stages being immutable to actors in a subsequent stage of the pipeline, wherein each subsequent stage after a first stage of the build pipeline depends on an immutable output of a previous stage in the build pipeline;
  detect the trusted configuration artifact has been committed to an infrastructure as code (IAC) repository from a secure pipeline, the trusted configuration artifact including a description of a configuration of a cluster of one or more machines;
  access the trusted configuration artifact from the IAC repository; and
    automatically deploy the configuration using an orchestrator of the orchestration system to change a state of the cluster, according to an orchestration type associated with the trusted configuration artifact, including determining the orchestration type associated with the orchestrator based on a configuration option associated with the trusted configuration artifact and determining the orchestrator responsible for deploying the determined orchestration type for the configuration associated with the trusted configuration artifact.

18. The system defined in claim 17 wherein the one or more hardware processors are operable to automatically deploy the configuration to change the state of the cluster by compiling code and signaling one or more orchestrators to perform the update to the configuration with the compiled code.

19. The system defined in claim 17 wherein the one or more processors are operable to signal the one or more orchestrators by performing protected writes to the one or more orchestrators to interact with the cluster to update the configuration.

20. The system defined in claim 17 wherein the trusted configuration artifact has been signed by a person proposing the change to the configuration and a separate peer review and approval to become committed into the IAC repository.

* * * * *